(12) United States Patent
Haglin et al.

(10) Patent No.: US 10,885,117 B2
(45) Date of Patent: Jan. 5, 2021

(54) GRAPH SEARCH OPTIMIZATION SYSTEM BASED ON DERIVED CONSTRAINT TECHNIQUES

(71) Applicant: Trovares, Inc., Seattle, WA (US)

(72) Inventors: David Haglin, Seattle, WA (US); Daniel Chavarria-Miranda, Kennewick, WA (US); Robert Adolf, Mercer Island, WA (US)

(73) Assignee: TROVARES, INC., Seattle, WA (US)

( * ) Notice: Subject to any disclaimer, the term of this patent is extended or adjusted under 35 U.S.C. 154(b) by 0 days.

(21) Appl. No.: 15/961,771

(22) Filed: Apr. 24, 2018

(65) Prior Publication Data
US 2019/0325077 A1 Oct. 24, 2019

(51) Int. Cl.
*G06F 16/901* (2019.01)
*G06F 16/245* (2019.01)
(Continued)

(52) U.S. Cl.
CPC ........ *G06F 16/9024* (2019.01); *G06F 16/245* (2019.01); *G06K 9/6201* (2013.01);
(Continued)

(58) Field of Classification Search
CPC .............. G06F 16/835; G06F 16/9024; G06F 16/24544; G06F 16/24545; G06F 16/2456; G06F 16/242; G06F 16/24542; G06F 16/24564; G06F 16/288; G06F 16/2458; G06F 17/274; G06F 17/277; G06F 16/245; G06F 16/90335; G06F 16/211;
(Continued)

(56) References Cited

U.S. PATENT DOCUMENTS 8,316,060 B1* 11/2012 Snyder, II ........... G06F 16/9024
707/797
8,396,884 B2* 3/2013 Singh .................. G06F 16/9024
707/760
(Continued)

FOREIGN PATENT DOCUMENTS

WO 2017147396 A1 8/2017

OTHER PUBLICATIONS

Batarfi, O., et al., "A distributed query execution engine of big attributed graphs", SpringerPlus (2016) 5:665, 26 pages.
(Continued)

*Primary Examiner* — Dennis Truong
(74) *Attorney, Agent, or Firm* — Perkins Coie LLP

(57) ABSTRACT

Various systems are provided for optimizing the searching of a graph for a portion that matches a pattern is provided. A Graph Search Optimization System ("GSOS") provides various techniques for reducing the computational expense when searching for patterns within a graph. The GSOS provides techniques that include an edge-count directed ("ECD") system, a derived constraint ("DC") system, and a sorted property ("SP") system. The ECD system matches a pattern in a direction based on the number of edges for that direction. The DC system derives a single-element constraint from a multi-element constraints to avoid having to check multiple elements. The SP system processes edges of a graph in a sorted order based on the value of a property of the edges.

17 Claims, 13 Drawing Sheets

(51) Int. Cl.
*G06F 16/242* (2019.01)
*G06F 16/2455* (2019.01)
*G06F 16/903* (2019.01)
*G06F 16/2453* (2019.01)
*G06F 16/2458* (2019.01)
*G06K 9/62* (2006.01)
*G06K 9/46* (2006.01)

(52) U.S. Cl.
CPC ......... *G06K 9/6296* (2013.01); *G06F 16/242* (2019.01); *G06F 16/24542* (2019.01); *G06F 16/24564* (2019.01); *G06F 16/90335* (2019.01); *G06K 9/469* (2013.01); *G06K 9/627* (2013.01); *G06K 9/6224* (2013.01)

(58) Field of Classification Search
CPC .......... G06F 16/243; Y10S 707/99935; Y10S 707/99933; G06N 5/025; G06N 20/00; G06N 5/02; G06N 5/047; G06Q 50/01; G06K 7/143; G06K 9/62; G06K 9/6296; G06K 9/469; G06K 9/6224; G06K 9/627; G06K 9/6201
See application file for complete search history.

(56) References Cited

U.S. PATENT DOCUMENTS

| | | |
|---|---|---|
| 2012/0072887 A1 | 3/2012 | Basak |
| 2012/0136635 A1* | 5/2012 | Hung ............... G06F 30/30 703/2 |
| 2012/0259793 A1 | 10/2012 | Umansky et al. |
| 2012/0283948 A1* | 11/2012 | Demiryurek ....... G01C 21/3446 701/533 |
| 2014/0172914 A1* | 6/2014 | Elnikety ............. G06F 16/9024 707/774 |
| 2016/0179883 A1* | 6/2016 | Chen ................. G06F 16/24528 707/714 |
| 2016/0224637 A1* | 8/2016 | Sukumar ............. G06F 16/2465 |
| 2017/0193378 A1* | 7/2017 | Fertig ................ G06Q 10/0631 |
| 2017/0213089 A1* | 7/2017 | Chen ..................... G06K 9/469 |
| 2017/0228448 A1* | 8/2017 | Fan ...................... G06Q 10/101 |
| 2017/0300593 A1* | 10/2017 | Inoue ................. G06F 16/2372 |
| 2017/0308620 A1* | 10/2017 | Cao ..................... G06F 16/9024 |
| 2018/0203897 A1* | 7/2018 | Van Rest ............ G06F 16/9024 |

OTHER PUBLICATIONS

Striebel, L., "A High-level Graph Query Language Interface for Differential Dataflow", Master Thesis, ETH Library, 2017, 69 pages.

Bai, Yiyuan, et al., "G-Path: Flexible Path Pattern Query on Large Graphs," School of Software, Tsinghua University, Beijing 100084, China.

Wu, Xiaoying, et al., "Efficient Evaluation of Generalized Path Pattern Queries on XML Data," 10 pages.

* cited by examiner $$(A,B).t < (C,B).t < (D,C).t < (A,C).t \quad \sim^{121}$$

$$(C,B).t < (A,B).t < 60\sec \quad \sim^{122}$$

$$A.c = "US" \text{ AND } B.c = "UK" \quad \sim^{123}$$

GRAPH SEARCH OPTIMIZATION SYSTEM BASED ON DERIVED CONSTRAINT TECHNIQUES

BACKGROUND

Data relationships are often modeled as a graph with the vertices of the graph representing entities and the edges of the graph representing relationships between the entities. For example, communications data relating to communications between people can be represented by a graph that includes a vertex for each person with an edge between two vertices indicating a communication between the people represented by vertices. As another example, web traffic data relating to people selecting links on a web site (or individual web pages) that are to another web site can be represented by a graph that includes a vertex for each web site with an edge between vertices indicating that a person selected a link on the web site represented by one of the vertices to travel to the web site represented by the other vertex.

To provide even more information, a graph may include directed edges that are each from an out vertex (also referred to as a source vertex) to an in vertex (also referred to as a target vertex). For example, for communication data, a directed edge indicates that the person represented by the out vertex sent a communication (e.g., electronic message) to the person represented by the in vertex. As another example, for web traffic data, a directed edge indicates that the person visiting the web site represented by the out vertex selected a link to visit the web site represented by the in vertex.

Such graphs may also have properties associated with elements (i.e., vertices and edges) of the graph. Each property has a value. For example, for communications data, an edge may have a sent time property indicating the time when the communication was sent, a type property indicating the type of the communication (e.g., email or vmail), a content property indicating the content of the communication, and so on. For web traffic data, an edge may have a time property indicating the time when the link was selected, a web page property indicating the web page that contained the selected link, a link property specifying the link selected, a session property identifying a unique user session (e.g., a combination of a machine identifier, a browser identifier, and a session start time), and so on. A vertex of a graph representing either communications data or web traffic day may store properties related to the person represented by the vertex such as a name property, an employer property, a citizen property, a postal address property, a sex property, and so on.

Graphs can be used to represent data relationships that include billions of entities (e.g., people, web pages) and many billions of relationships between entities (e.g., travel between web pages). As such, a graph that represents such data relationships can have many billions of vertices and edges.

Such large graphs store a wealth of valuable information, but the information can be difficult to extract. For example, someone may want to identify all communication cycles between persons A, B, C, and D in which A sent a communication to B and then to C, then C sent a communication to D, and then D sent a communication to B within 60 seconds of A sending the communication to B. FIG. 1 illustrates a pattern of communications representing the example. The vertices 101, 102, 103, and 104 represent persons A, B, C, and D, respectively, and the directed edges 111, 112, 113, and 114 represent the communications between AB, AD, DC, and CB, respectively. Each edge has a sent property with the values of 10, 15, 45, and 65 for edges 111, 112, 113, and 114, respectively. So, to match the pattern, a group of four vertices needs to have edges in the directions shown and in addition the sent times of the edges need to satisfy the constraints 121, 122, and 123. Constraint 121 specifies that the sent times of communications is that AB is before AD, AD is before DC, and DC is before CB. Constraint 122 specifies that the sent time of CB is within 60 seconds of the sent time of AB. Constraint 123 specifies that A is a citizen of the US and B is a citizen of the UK. C and D may be considered to have a null constraint in that any vertex will satisfy the null constraint irrespective of the values of its property. Similarly, an edge of a path pattern without a constraint explicitly specified is considered to have a null constraint.

When searching for vertices that match a pattern, every vertex of the graph needs to be checked for every vertex of the pattern. So, for a given vertex X in a graph, the graph needs to be checked in the positions of vertices A, B, C, and D. In addition, since a graph can many hundreds of millions of vertices and each vertex can have thousands of incoming and outgoing edges, it can be very computationally expensive to identify all the sets of edges of a graph that match a pattern. Moreover, it may take so long to identify the matching sets of edges that the extracted information may no longer be useful.

DETAILED DESCRIPTION

Methods and systems for optimizing the searching of a graph for a portion that matches a pattern is provided. In some embodiments, a Graph Search Optimization System ("GSOS") provides various techniques for reducing the computational expense when searching for patterns within a graph. The GSOS provides techniques that include an edge-count directed ("ECD") system, a derived constraint ("DC") system, and a sorted property ("SP") system.

Figure 1:
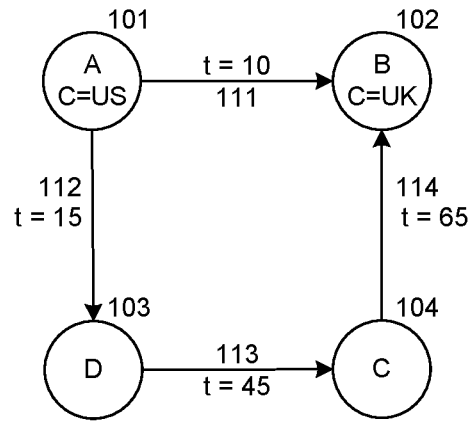
FIG. 1 illustrates a pattern of communications representing the example.

The vertices of the path pattern are represented using an uppercase letter (e.g., A) and a vertex of the graph that corresponds to a vertex of the path pattern is represented using an uppercase letter with a prime (e.g., A'). Edges are represented by their connected vertices (e.g., (A, B)) with the first element representing the out vertex of the pair. So, the path pattern of FIG. 1 is represented as {(A, B) (C, B) (D, C) (A, D)}, and a partial matching path may be represented as {(A', B') (C', B')}. Properties of edges and vertices are represented by a lowercase letter (e.g., a). Thus, the sent time property for edge (A, B) may be represented as (A, B)·t, and a citizen property for vertex A may be represented as A·c.

In some embodiments, the ECD system employs edge-count directed searching that factors in the count of edges when deciding which end of a pattern to extend next. The ECD system thus finds a matching path of a graph that matches a path pattern by repeatedly extending a partial matching path in a direction (or end) based on a predecessor count of edges that are predecessors to the first edge in the partial matching path that match a constraint (e.g., edge direction) of a predecessor edge specified by the path pattern and a successor count of edges that are successors to the last edge in the partial matching path that match a constraint of a successor edge specified by the path pattern. Referring to FIG. 1, (A, D) is the predecessor edge to (A, B), and (C, B) is the successor edge to (A, B). So, if the partial matching path is {(A', B')} and the out-degree of A' is 10, and the in-degree of B' is 100, then the ECD system would extend the partial matching path by searching for matches to (A, D). By extending the partial matching path by predecessor edges of the first edge or successor edges of the last edge based on predecessor edge count or successor edge count, the ECD system can significantly decrease the computational resources needed to search for a path that matches a path pattern.

Figure 2:
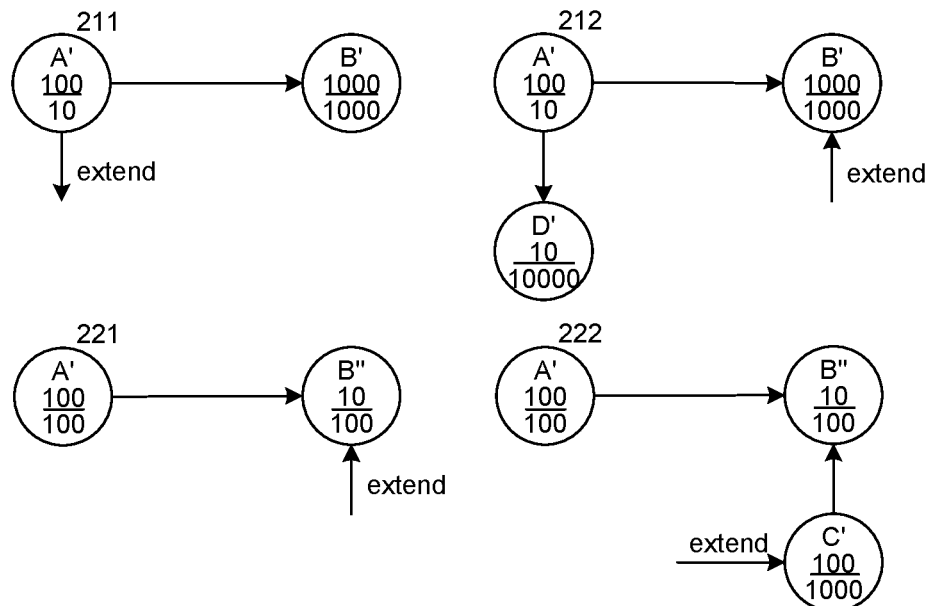
FIG. 2 illustrates an example of finding a matching path using an edge-count directed system.

FIG. 2 illustrates an example of finding a matching path using an edge-count directed system. The example assumes matching the path pattern of FIG. 1 without the sent time-based constraints. The numbers in the vertices illustrate the in-degree above the out-degree. Partial matching paths 211 and 212 illustrate an example of extending partial matching paths. The ECD system starts the search with a partial matching path of {(A', B')}, which matches edge (A, B) of the path pattern. Since vertex A' has an out-degree of 10 as candidates for matching predecessor edge (A', D') and vertex B' has an in-degree of 1000 as candidates for matching successor edge (C', B'), the ECD system extends the partial matching path by matching edge (A, D) to each of the 10 out-edges (A', D') of vertex A'. Continuing with the example, since vertex D' has an out-degree of 10,000 as candidates for matching predecessor edge (D, C) and vertex B' has an in-degree of 1000 as candidates for matching successor edge (C, B), the ECD system extends the partial match path by matching successor edge (C, B) to each of the 1000 in-edges (C', B') of vertex B'.

Partial matching paths 221 and 222 illustrate another example of extending partial matching paths. The ECD system starts the search with a partial matching path of {(A', B')}, which matches edge (A, B) of the path pattern. Since vertex A' has an out-degree of 100 as candidates for matching predecessor edge (A, D) and vertex B' has an in-degree of 1000 as candidates for matching successor edge (C, B), the ECD system extends the partial matching path by matching successor edge (C, B)) to each of the 10 in-edges (C', B') of vertex B'. Continuing with the example, since vertex C' has an out-degree of 1000 as candidates for matching successor edge (D, C) and vertex A' has an out-degree of 100 as candidates for matching predecessor edge (A, D), the ECD system extends the partial match path by matching successor edge (C, D) to each of the 100 in-edges of (D', C') as vertex C'.

In some embodiments, the DC system inputs constraints relating to multiple elements ("multi-element constraints") of a path pattern and derives from those constraints a derived constraint relating to only one of the elements ("a single-element constraint"). For example, a constraint relating to multiple edges ("a multi-edge constraint") may be "(A, B)·a<(B, C)·a." In this example, the constraint relates to adjacent edges (A, B) and (B, C) in the path pattern. Another constraint relating to a single edge ("a single-edge constraint") may be "(B, C)·a<10". Given these two edge constraints, the DC system may derive another single-edge constraint that is "(A, B)·a<10" based on the algebraic principle that if x<y and y<z, then x is necessarily less than z. As another example, a constraint relating to multiple vertices ("a multi-vertex constraint") may be "A·d<B·d," and a constraint relating to a single vertex ("a single-vertex constraint") may be "B·d<1990" where d represents date of birth. Given these two vertex constraints, the DC system may derive another single-vertex constraint that is "A·d<1990" based on the same algebraic principle.

Continuing with the multi-edge constraint example, when searching, if the edge of the derived single-edge constraint is to be matched before another edge of the multi-edge constraint (e.g., the other edge is a predecessor edge or a successor edge, depending on the search direction), then the DC system determines whether the derived single-edge constraint is satisfied by that edge. For example, when an edge (A', B') is selected as matching (A, B) of the path pattern, the DC system determines whether the derived constraint "(A, B)·a<10" is satisfied." If the derived constraint is not satisfied, the DC system can exclude that edge as matching (A, B) of the path pattern. The DC system can result in a significant decrease in the search space and corresponding decrease in the computational resources needed to search a graph. For example, if there are 1000 next edges (B', C') to a current edge (A', B') and the current edge (A', B') does not satisfy a derived constraint "(A, B)·a<10," then the DC system can avoid checking any of those next edges, assuming the current edge is (A', B'), and can eliminate the current edge as matching the edge (A, B) of the pattern. Moreover, if the derived constraint for a current edge (A, B) is derived from a certain value, of not the next edge (B, C), but of the edge after the next edge (C, D), then the DC system can avoid having to check a number of edges that is the total of the count of the next edges and, for each next edge, the count of its next edge. Thus, if each vertex of the graph has a degree of 1000, the DC system avoids having to search for 1,001,000 edges (i.e., 1000+(1000×1000)). By using derived single-elements constraints (i.e., derived single-edge constraints and/or derived single-vertex constraints), the DC system can significantly reduce the computational resources needed to search for paths that match a path pattern. In the following, the DC system is described primarily in the context of derived single-edge constraints even though the DC system may be used in a similar manner to employ single-vertex constraints.

In some embodiments, the DC system applies rules to constraints to derive the derived constraints for a property graph. Each rule has a condition and a derived constraint. For example, a condition may be "a<b AND b<c" and the derived constraint may be "a<c." The DC system may store the rules in a rules table. The following table is an example of a rules table:

| Rules Table | | |
|---|---|---|
| Rules | Condition | Derived Fact |
| 1 | a = b | b = a |
| 2 | a = b<br>b = c | a = c |
| 3 | a = b + c | b = a + (−c)<br>c = a + (−b) |
| 4 | a < b | b > a |
| 5 | a < −b | b < −a |
| 6 | a < b<br>b < c | a < c |
| 7 | a > b + c | b < a + (−c)<br>c < a + (−b) |
| 8 | a > b + c<br>b > d | a > d + c |

Rule 6 is a rule for specifying the condition of "a<b AND b<c" and the derived constraint of "a<c." To derive constraints, the DC system initializes a collection of constraints for a search of the constraints specified in the path pattern, which are referred to as initial constraints. For example, if a path pattern has the constraints of "(A, B)·m<(B, C)·n," "(B, C)·n<(C, D)·o," and "5>(C, D)·o−(A, B)·m," then the initial constraints may be represented by the following constraint table:

| Constraint Table | |
|---|---|
| Initial constraints: | |
| 1 | x < y |
| 2 | y < z |
| 3 | 5 > z + (−x) | where x represents (A, B)·m, y represents (B, C)·n, and z represents (C, D)·o. After initializing the collection, the DC system applies the rules to the constraints in the collection to derive new derived constraints, adds the newly derived constraints to the collection, and again applies the rules to the constraints in the collection that includes the newly derived constraints to derive new constraints based on the newly derived constraints. The DC system may repeat this process until no more rules can be derived. Applying the rules of the example rules table, the DC system may derive the derived constraints as represented by the following table:

| | Derived Constraints | Matching Conditions | Rule |
|---|---|---|---|
| 4 | y > x | x < y | 4 |
| 5 | z > y | y < z | 4 |
| 6 | z < 5 + (−(−x))<br>(−x) < 5 + (−z) | 5 > z + (− x) | 7 |
| 7 | x > (−5) + (−(−z)) | (−x) < 5 + (−z) | 5 |
| 8 | 5 > y + (−x) | 5 > z + (−x)<br>z > y | 8 |

Some of the derived constraints may not lead to reducing the search space. For example, the derived constraint "y>x," constraint number 4, is not used to derive additional derived constraints and is just a restatement of an initial fact. The derived constraint "z>y," constraint number 5, is, however, used to derive the derived constraint "5>y+(−x)," constraint number 8, by applying rule 8 to initial constraint "5>z+(−x)" and derived constraint "z<y." When searching for matching paths with the initial constraints, the DC system can apply constraint number 8 to edges (A', B') and (B', C'). So even if constraint number 1 is satisfied, if constraint 8 is not satisfied, the DC system can eliminate (B', C') as a possible next edge in a matching pattern. Without constraint 8, the search would need to check each next edge (C', D') only to find that there is no edge (C', D') that leads to all the initial constraints being satisfied. Thus, by generating and applying derived constraints, the DC system significantly reduces the search space.

In some embodiments, the SP system identifies edges of a property graph that satisfy a multi-edge constraint by sorting the edges and then advancing through the edges in sorted order. A multi-edge constraint is a constraint of a path pattern that is based on the value of properties of two different pattern edges. For example, the constraint "(A, B)·a>(B, C)·a" is a multi-edge constraint based on two different pattern edges. When the SP system is searching for a matching path in a property graph that matches a path pattern and a first set of first edges and a second set of second edges are to be checked to determine which combination pairs of a first edge and second edge match the multi-edge constraint, the SP system generates a first sort of the first set and a second sort of the second set. Continuing with the example, the first edges are edges (A', B') and the second edges are edges (B', C'). The SP system may sort the sets of edges in increasing order. The SP system then alternates advancing a current first edge through the first sort until the multi-edge constraint is satisfied and then advancing a current second edge through the second sort until the multi-edge constraint is not satisfied. Whenever a combination of a current first edge and current second edge satisfies the constraint, the SP system designates as satisfying the constraint each combination of the current second edge and a first edge from the current first edge to the last first edge. The SP system then switches to advancing the other current edge. The SP system continues until the end of the first sort or the second sort is reached.

Table 1 contains example values for property "a" for first edges (A', B') and second edges (B', C') that have been sorted in increasing order:

| | 1 | 2 | 3 | 4 | 5 | 6 | 7 | 8 | 9 |
|---|---|---|---|---|---|---|---|---|---|
| (A', B') | 1 | 2 | 5 | 7 | 9 | 15 | 20 | 21 | 22 |
| (B', C') | 3 | 4 | 4 | 10 | 11 | 12 | 13 | | |

In this example, the property graph includes nine first edges and seven second edges. If the multi-edge constraint is "(A, B)·a>(B, C)·a," then the SP system proceeds as follows:

| Step | Current<br>1st Edge<br>(A', B') | Current<br>2nd Edge<br>(B', C') | Satisfied | Matching<br>Combinations |
|---|---|---|---|---|
| 1 | 1 | 1 | N | |
| 2 | 2 | 1 | N | |
| 3 | 3 | 1 | Y | (3-9, 1) |
| 4 | 3 | 2 | Y | (3-9, 2) |
| 5 | 3 | 3 | Y | (3-9, 3) |
| 6 | 3 | 4 | N | |

-continued

| Step | Current 1st Edge (A', B') | Current 2nd Edge (B', C') | Satisfied | Matching Combinations |
|---|---|---|---|---|
| 7 | 4 | 4 | N | |
| 8 | 5 | 4 | N | |
| 9 | 6 | 4 | Y | (6-9, 4) |
| 10 | 6 | 5 | Y | (6-9, 5) |
| 11 | 6 | 6 | Y | (6-9, 6) |
| 12 | 6 | 7 | Y | (6-9, 7) |

The SP system thus evaluates the multi-edge constraint 12 times. In comparison, if the edges were not sorted, a search would require 63 (i.e., 9×7) evaluations. The edges could also be sorted in decreasing order, and similar algorithms could be applied.

Figure 3:
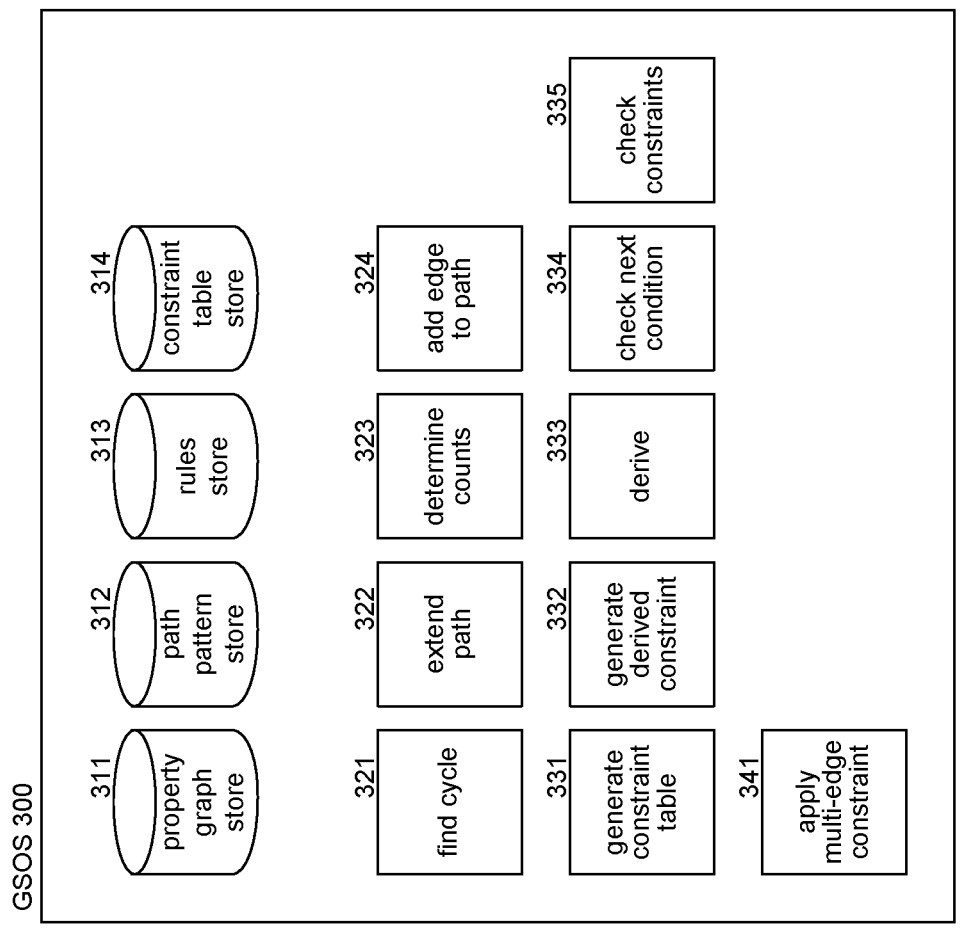
FIG. 3 is a block diagram that illustrates components of the GSOS in some embodiments.

FIG. 3 is a block diagram that illustrates components of the GSOS in some embodiments. The GSOS 300 includes stores 311-314, ECD components 321-324, DC components 331-335, and SP component 341. A property graph store 311 stores a property graph data structure that includes vertices, edges, and values for properties of the vertices and edges. A path pattern store 312 stores the path pattern that includes path vertices and path edges along with constraints. A rules store 313 stores rules for deriving constraints. A constraint table store 314 stores constraint tables generated when deriving constraints. A find cycle component 321 is invoked to find cycles that match a path pattern. An extend path component 322 is invoked by the find cycle component to extend a partial matching path. A determine counts component 323 is invoked by the extend path component to determine the counts of predecessor and successor edges. An add edge to path component 324 is invoked by the extend path component to add an edge to a path. A generate constraint table component 331 is invoked to generate constraint tables for derived constraints based on the constraints of a path pattern. A generate derived constraint component 332 is invoked by the generate constraint table component to generate derived constraints. The derive component 333 is invoked by the generate derived constraint component to derive constraints based on a rule. A check next condition component 334 is invoked by the derive component to generate the next condition of the rule. A check constraints component 335 determines whether an edge satisfies the associate constraint of a path pattern. An apply multi-edge constraint component 341 is invoked to apply a multi-edge constraint using sorted properties.

The computing systems (e.g., network nodes or collections of network nodes) on which the GSOS may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the GSOS. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The GSOS may be described in the general context of computer-executable instructions, such as program modules and components, executed by one or more computers, processors, or other devices. Generally, program modules or components include routines, programs, objects, data structures, and so on that perform tasks or implement data types of the GSOS. Typically, the functionality of the program modules may be combined or distributed as desired in various examples. Aspects of the GSOS may be implemented in hardware using, for example, an application-specific integrated circuit ("ASIC") or field programmable gate array ("FPGA").

Figure 4:
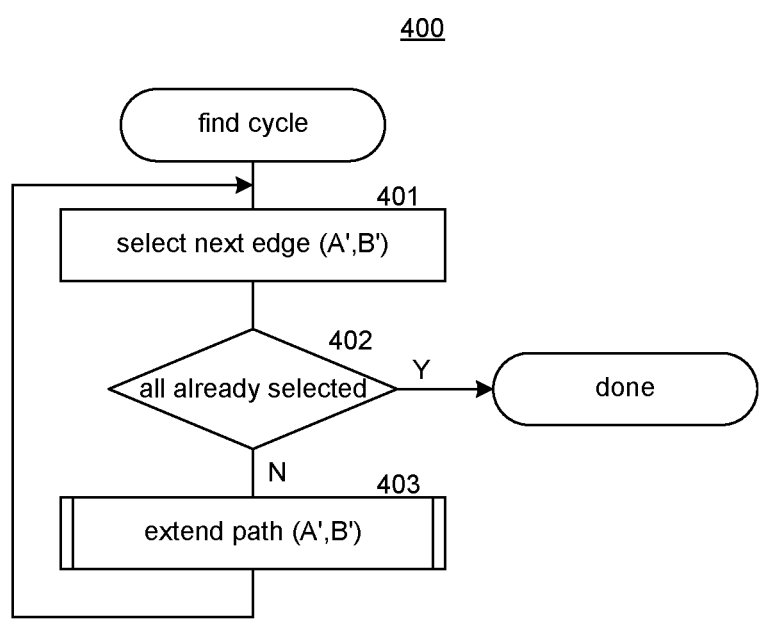
FIG. 4 is a flow diagram that illustrates a find cycle component of the ECD system in some embodiments.

FIGS. 4-7 are flow diagrams that illustrates the processing of an edge-count directed system of the GSOS in some embodiments. FIG. 4 is a flow diagram that illustrates a find cycle component of the ECD system in some embodiments. A find cycle component 400 is invoked to find a cycle within a graph that matches a cycle pattern. A cycle pattern is a cycle of edges that each have a specified direction. For example, the cycle pattern of FIG. 1 is {(A, D) (D, C) (C, B) (A, B)}. This path pattern is a cycle pattern because the start edge (A, D) and the end edge (A, B) share the same vertex A. The component selects an anchor edge of the cycle pattern such as (A, B) and loops matching each edge (A', B') of the graph to the anchor edge and, assuming that they match, identifying all cycles that include (A', B'). In block 401, the component selects a next edge (A', B') of the graph to match to the anchor edge. In decision block 402, if all the edges have already been selected, then the component completes, else the component continues at block 403. In block 403, the component invokes an extend path component, passing an indication of the selected edge (A', B') as an initial partial matching path to extend the path assuming (A', B'). In some embodiments, the component may allocate a separate thread of execution for each edge so that the extending based on multiple anchor edges may be performed in parallel. For example, the component may create 1000 threads of execution and initially schedule each thread of execution to invoke the extend path component for one of, for example, 2000 edges. When a thread of execution completes, the component may schedule that thread of execution to invoke the extend path component for another thread.

Figure 5:
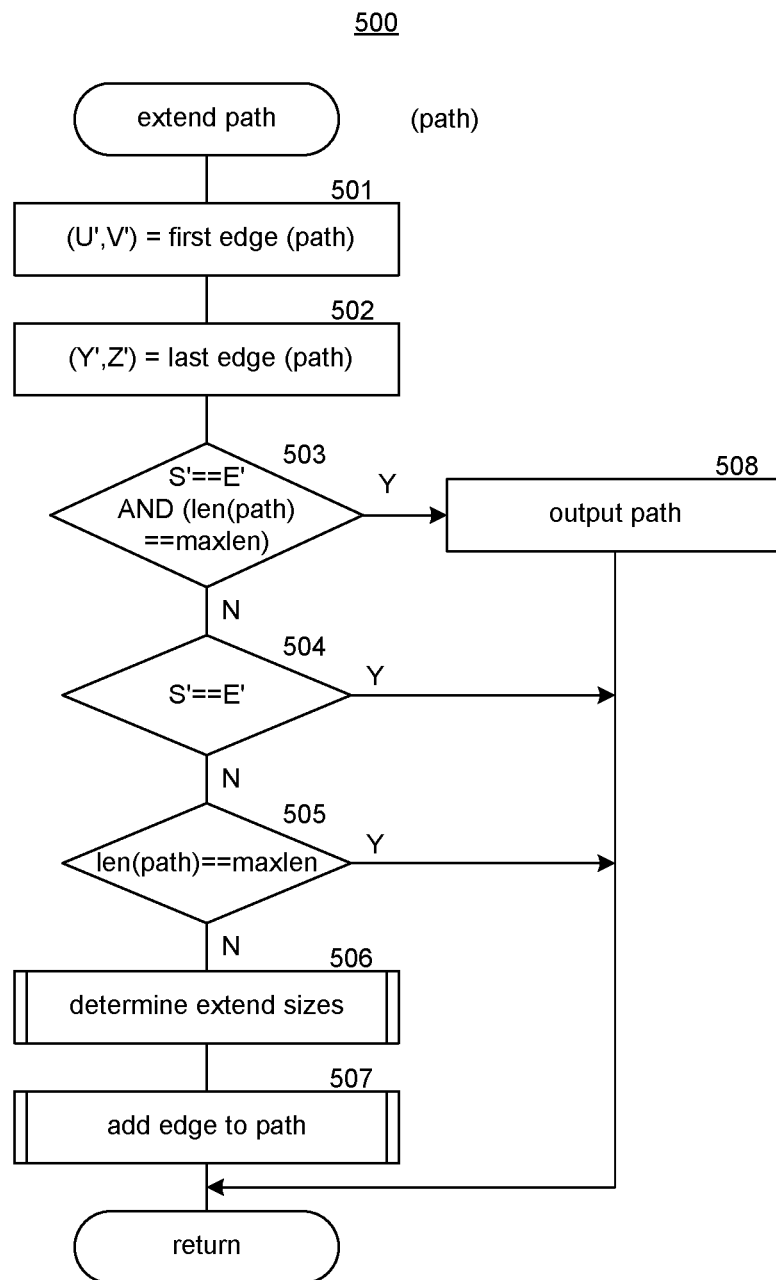
FIG. 5 is a flow diagram that illustrates the processing of an extend path component of the ECD system in some embodiments.

FIG. 5 is a flow diagram that illustrates the processing of an extend path component of the ECD system in some embodiments. The extend path component 500 is passed an indication of a partial matching path and extends the partial matching path until a match is found or the partial matching path cannot be extended to match. In block 501, the component sets an edge (U', V') to the first edge in the partial matching path. In block 502, the component sets the edge (Y', Z') to the last edge in the partial matching path. In decision block 503, if the start vertex S' of the partial matching path (i.e., U' or V' depending on which is the vertex shared with the next edge in the partial matching path) is the same as the end vertex E' (i.e., Y' or Z' depending on which is not the vertex shared with the prior edge in the partial matching path) and the length of the partial matching path is equal to the length of the cycle pattern, then the partial matching path is a complete matching path that matches the cycle pattern and the component continues at block 508, else the component continues at block 504. In decision block 504, if vertex S' is the same as vertex E', then the partial matching path includes a sub-cycle and thus cannot match the cycle pattern and the component completes, else the component continues at block 505. In decision block 505, if the length of the partial matching path is equal to the length of the cycle pattern, then a match has not been found and the component completes, else the component continues at block 506. In block 506, the component invokes the determine extends sizes component to determine the count of the predecessor edges of start vertex S' and the count of the successor edges of end vertex E'. In block 507, the component invokes an add edge to path component to add an edge to the partial matching path and then returns. In block 508, the component outputs the complete matching path as a match to the cycle pattern and then completes.

Figure 6:
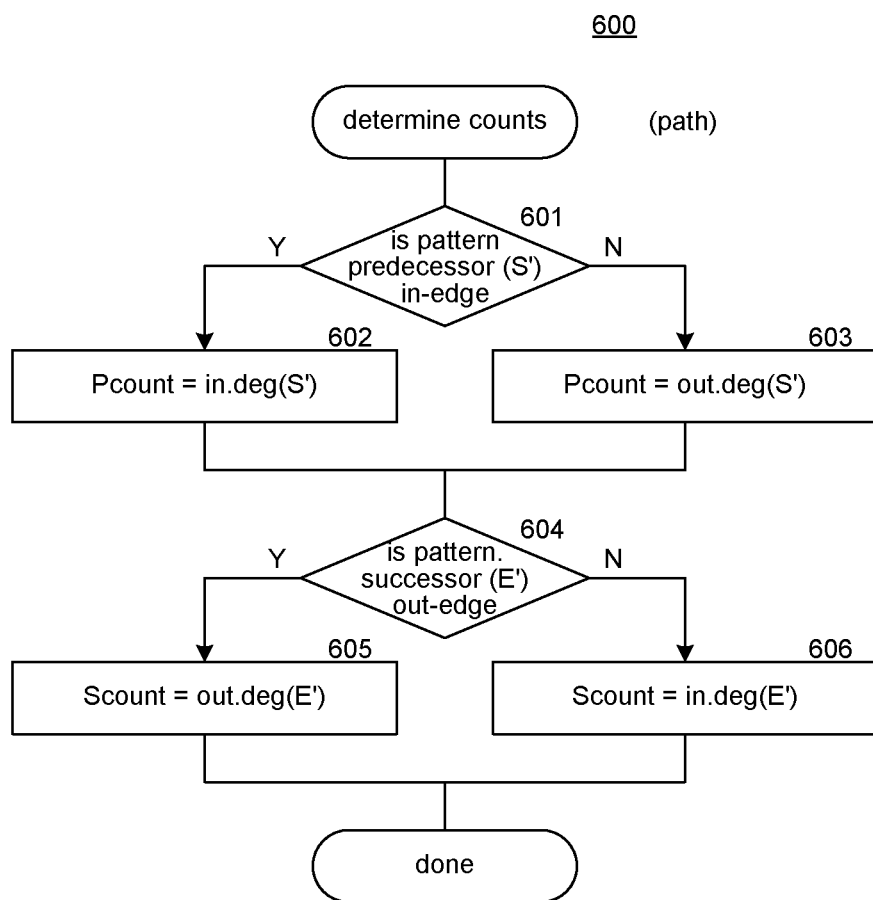
FIG. 6 is a flow diagram that illustrates the processing of a determine counts component of the ECD system in some embodiments.

FIG. 6 is a flow diagram that illustrates the processing of a determine counts component of the ECD system in some embodiments. The determine counts component 600 is passed an indication of the partial matching path and determines the predecessor count and the successor count. In decision block 601, if the cycle pattern indicates that the predecessor edge to the start vertex S' in the partial matching path is an in-edge (i.e., (R', S')), then the component continues at block 602, else the component continues at block 603. In block 602, the component sets the predecessor count (i.e., Pcount) to the in-degree of the start vertex S'. In block 603, the component sets the predecessor count to the out-degree of the start vertex S' in the path. In decision block 604, if the cycle pattern indicates that the successor edge to the end vertex E' in the partial matching path is an out-edge, then the component continues at block 605, else the component continues at block 606. In block 605, the component sets the successor count (i.e., Scount) to the out-degree of the end vertex E' and completes. In block 606, the component sets the successor count to the in-degree of the end vertex E' and completes.

Figure 7:
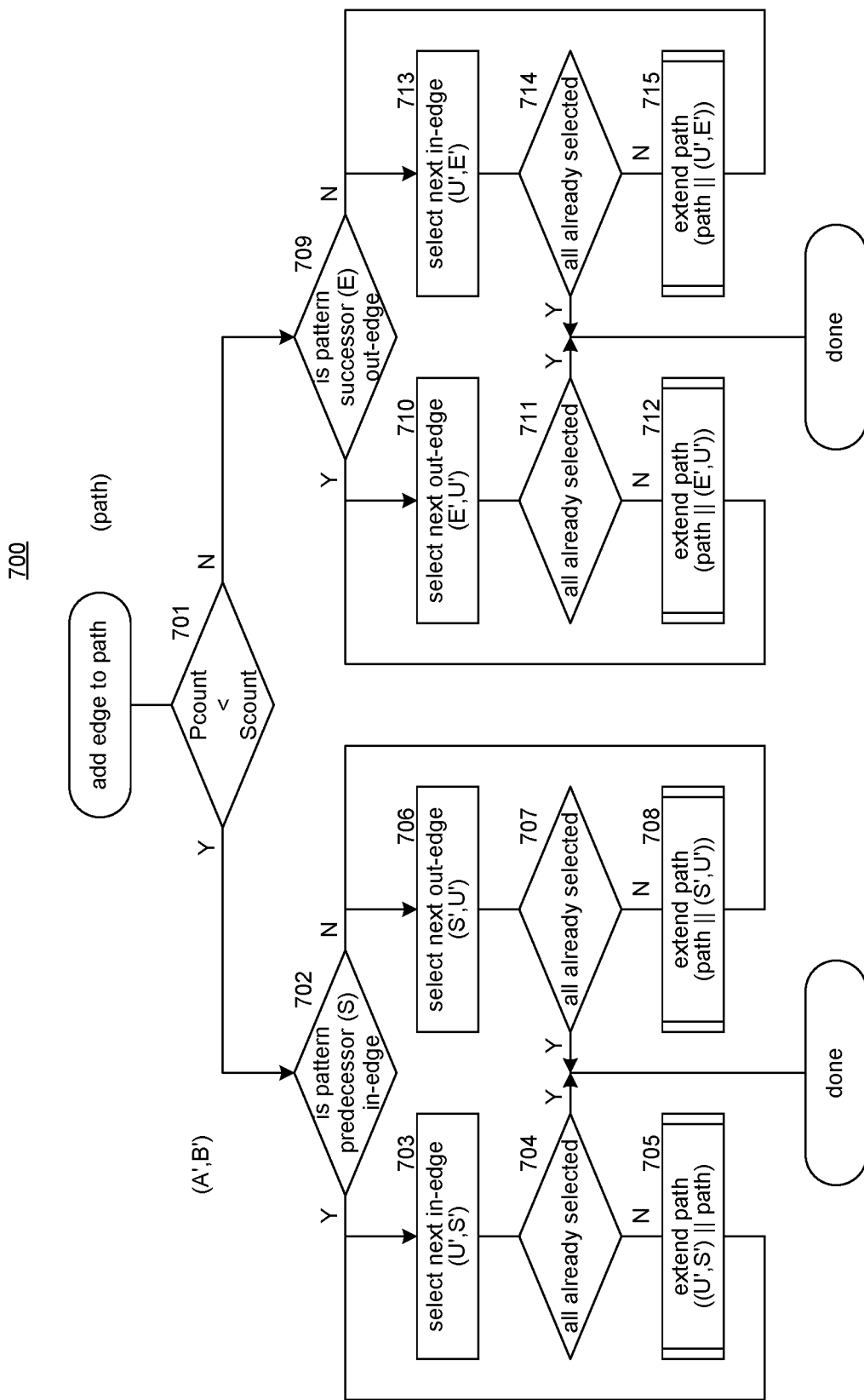
FIG. 7 is a flow diagram that illustrates the processing of an add edge to path component of the ECD system in some embodiments.

FIG. 7 is a flow diagram that illustrates the processing of an add edge to path component of the ECD system in some embodiments. The add edge to path component 700 is invoked to add an edge to the partial matching path. In decision block 701, if the predecessor count is less than the successor count, then the component continues at block 702, else the component continues at block 709. In decision block 702, if the predecessor edge in the cycle pattern is an in-edge, then the component continues at block 703, else component continues at block 706. In block 703, the component selects the next predecessor in-edge (U', S'). In decision block 704, if all the predecessor in-edges have already been selected, then the component completes, else the component continues at block 705. In block 705, the component recursively invokes the extend path component, passing the partial matching path extended by the selected predecessor in-edge, and then loops to block 703 to select the next predecessor in-edge. In block 706, the component selects the next predecessor out-edge (S', U'). In decision block 707, if all the predecessor out-edges have already been selected, then the component completes, else the component continues at block 708. In block 708, the component recursively invokes the extend path component, passing the partial matching path extended by the selected predecessor out-edge, and loops to block 706 to select the next predecessor out-edge. In decision block 709, if the successor edge in the cycle pattern is an out-edge, then the component continues at block 710, else the component continues at block 713. In block 710, the component selects the next successor out-edge (E', U'). In decision block 711, if all the successor out-edges have already been selected, then the component completes, else the component continues at block 712. In block 712, the component recursively invokes the extend path component, passing the partial matching path extended by the selected successor out-edge, and then loops to block 710 to select the next successor out-edge. In block 713, the component selects the next successor in-edge (U', E'). In decision block 714, if all the successor in-edges have already been selected, then the component completes, else the component continues at block 715. In block 715, the component recursively invokes the extend path component, passing the partial matching path extended by the selected successor in-edge, and then loops to block 713 to select the next successor in-edge. The component may also factor in a constraint based on the value of a property of the edge when deciding to extend with a predecessor edge or successor edge. For example, if the predecessor count is 1000, but only 50 predecessor edges match the constraint for that predecessor edge, and the successor count is 500 and there is no constraint on the successor edges (e.g., other than direction), then the component may decide to extend in the direction of the predecessor edges.

In some embodiments, the component may schedule a separate thread of execution for each invocation of the extend path component. In general, the ECD system may employ different strategies for scheduling the thread of execution. For example, the ECD system may schedule a thread of execution for each anchor edge, but not for any subsequent edge. In this way, the parallelism will only be at the anchor edge level. Alternatively, the ECD system may not schedule a separate thread of execution for each anchor edge but rather may schedule threads of execution when, for example, the second or third edges are added to a partial matching path. The parallelism strategy can be tailored to the characteristics of the path pattern and the graph. For example, if a graph has 1,000,000,000 edges with an average in-degree and out-degree of only 10 and the path pattern has four edges, then the strategy may be to have parallelism for the anchor edges, but not for other edges. The ECD system may also schedule each thread of execution to process a group of next edges. For example, if there are 1000 next edges, the ECD system may schedule 100 threads of execution to each process a group of 10 next edges.

Figure 8:
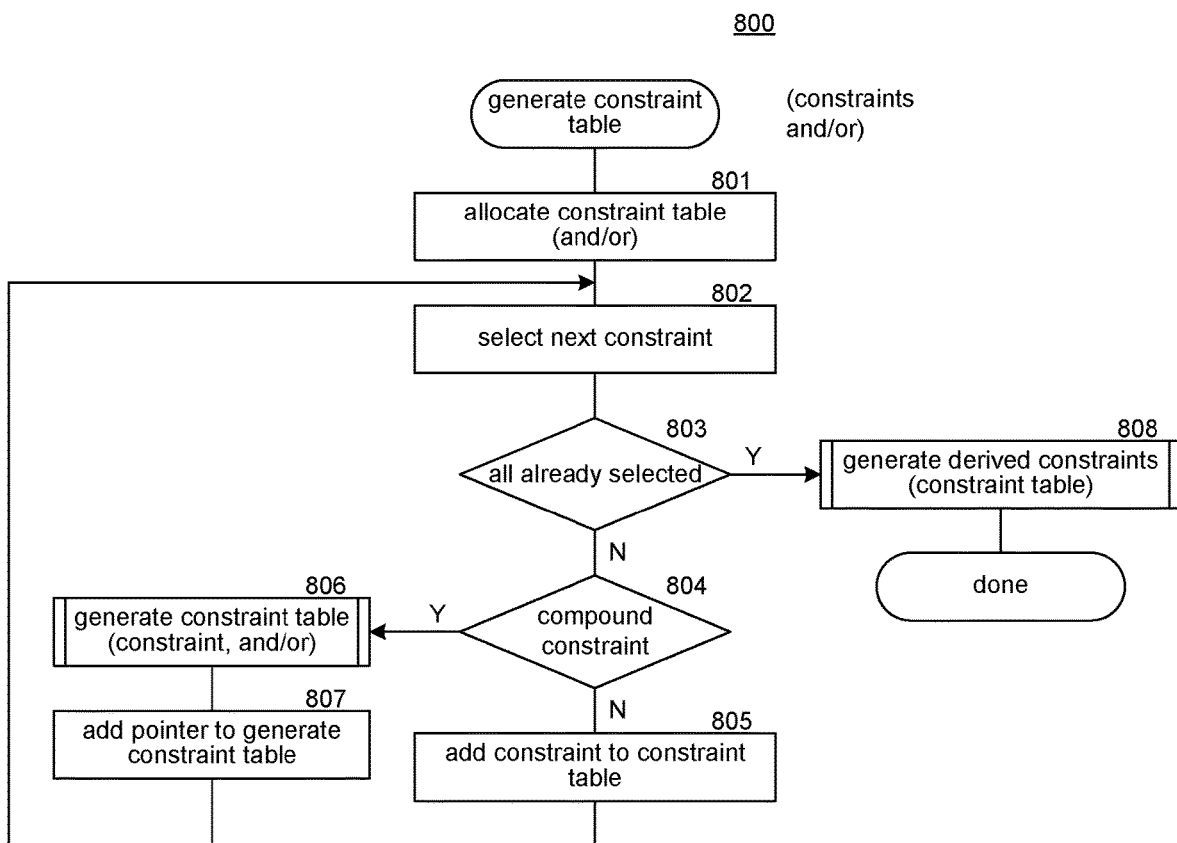
FIG. 8 is a flow diagram that illustrates the processing of a generate constraint table component of the DC system in some embodiments.

FIGS. 8-12 are flow diagrams that illustrate the processing of components of the DC system of the GSOS in some embodiments. FIG. 8 is a flow diagram that illustrates the processing of a generate constraint table component of the DC system in some embodiments. The component 800 is invoked to generate derived constraints based on a collection of constraints. The collection of constraints of a path pattern can be designated as having the type of AND or OR. If the initial collection of constraints has a type of AND, then if one of the constraints is a compound constraint (e.g., "A>B or A<C"), then the component generates a separate or child constraint table for the compound constraint with a type of OR. The component also links the constraint table to the child constraint table. When the DC system checks constraints of a constraint table, it checks the compound constraints represented by a child constraint table. In block 801, the component allocates a constraint table and designates its type. In blocks 802-807, the component loops selecting each constraint and adding it to the constraint table. In block 802, the component selects the next constraint. In decision block 803, if all the constraints have already been selected, then the component continues at block 808, else the component continues at block 804. In decision block 804, if the selected constraint is a compound constraint, then the component continues at block 806, else the component continues at block 805. In block 805, the component adds the constraint to the constraint table and loops to block 802 to select the next constraint. In block 806, the component recursively invokes the generate constraint table, passing an indication of the constraint table of the compound constraint along with an indication of the type. In block 807, the component adds a reference to the child constraint table for the compound constraint and then loops to block 802 to select the next constraint. In block 808, the component invokes a generate derived constraints component, passing an indication of the constraint table, and generates derived constraints from the initial constraints. The component then completes.

Figure 9:
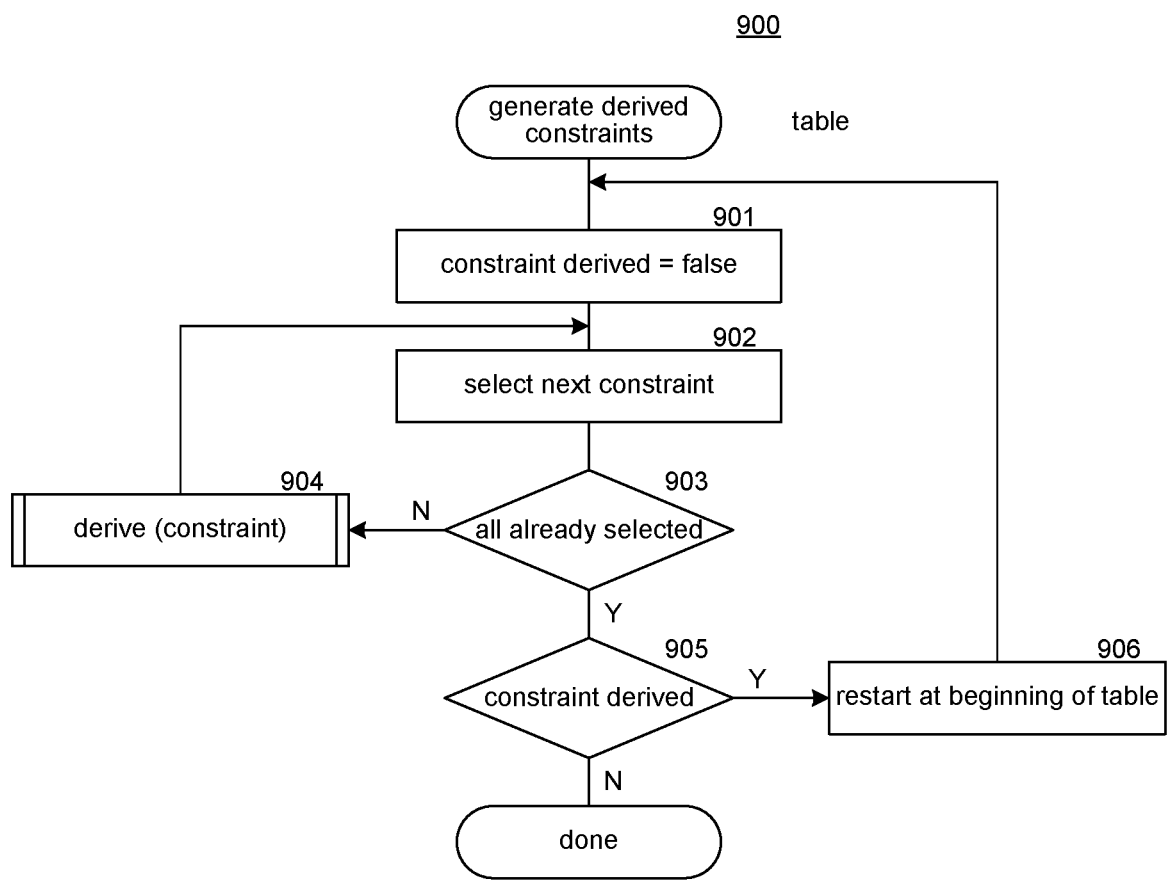
FIG. 9 is a flow diagram that illustrates the processing of a generate derived constraints component of the DC system in some embodiments.

FIG. 9 is a flow diagram that illustrates the processing of a generate derived constraints component of the DC system in some embodiments. The generate derived constraints component 900 is passed an indication of a constraints table and generates the derived constraints. In block 901, the component sets a flag to indicate that no constraints have yet been derived. In block 902, the component selects the next constraint of the constraint table. In decision block 903, if all the constraints have already been selected, then the component continues at block 905, else the component continues at block 904. In block 904, the component invokes a derive component, passing an indication of the selected constraint to generate the derived constraints, assuming that the selected constraint satisfies the first condition of the row. The component then loops to block 902 to select the next constraint. In decision block 905, if a constraint was derived as indicated by the constraint derived flag being set to true, then the component continues at block 906, else the component completes. In block 906, the component resets to start selecting constraints at the beginning of the constraint table and loops to block 901 to again process the constraints, factoring in the newly derived constraints.

Figure 10:
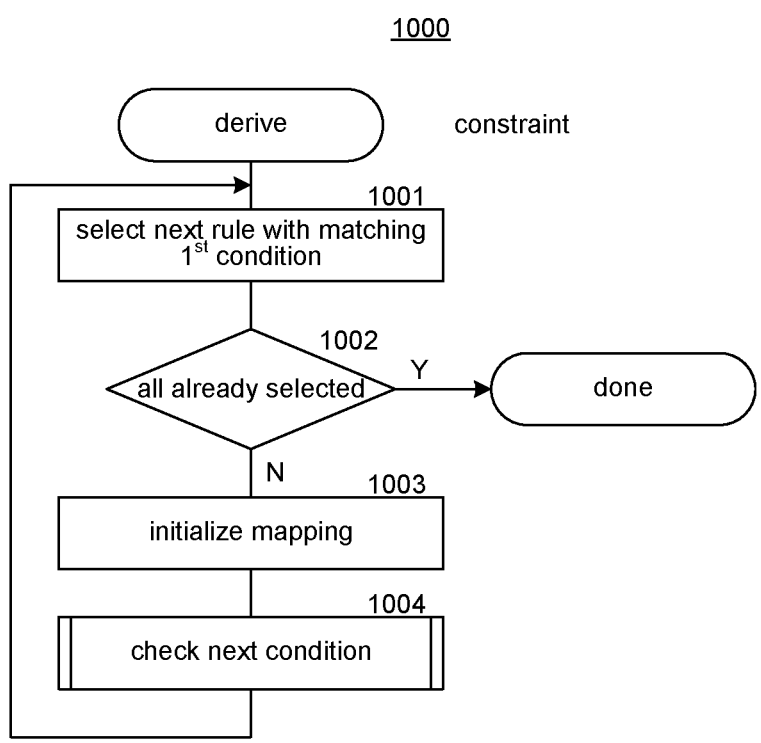
FIG. 10 is a flow diagram that illustrates the processing of a derive component of the DC system in some embodiments.

FIG. 10 is a flow diagram that illustrates the processing of a derive component of the DC system in some embodiments. The derive component 1000 is passed an indication of a constraint and attempts to derive additional constraints, assuming that the constraint matches the first condition of a rule. In block 1001, the component selects the next rule with a first condition that matches the constraint. In decision block 1002, if all the rules have already been selected, then the component completes, else the component continues at block 1003. In block 1003, the component initializes a mapping of properties of the constraint to variables of the first condition. In block 1004, the component invokes a check next condition component to check the additional conditions for the selected rule and loops to block 1001 to select the next rule.

Figure 11:
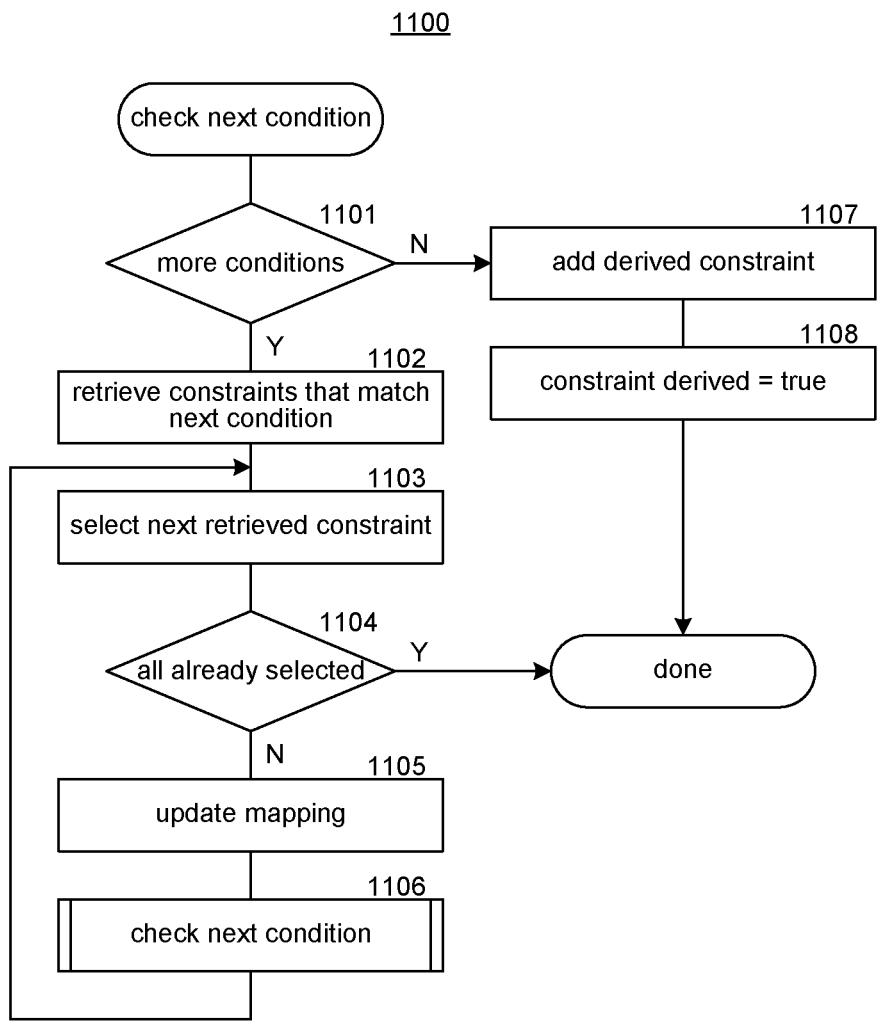
FIG. 11 is a flow diagram that illustrates the processing of a check next condition component of the DC system in some embodiments.

FIG. 11 is a flow diagram that illustrates the processing of a check next condition component of the DC system in some embodiments. The check next condition component 1100 is invoked to check the next condition of the rule. In decision block 1101, if the rule has more conditions, then the component continues at block 1102, else the component continues at block 1107. In block 1102, the component retrieves the constraints of the constraint table that match the next condition. In block 1103, the component selects the next retrieved constraint. In decision block 1104, if all the retrieved constraints have already been selected, then the component completes, else the component continues at block 1105. In block 1105, the component updates the mapping of properties to variables of the rule. In block 1106, the component recursively invokes the check next condition component to check the next condition of the rule and loops to block 1103 to select the next retrieved constraint. In block 1107, the component adds the derived constraint to the constraint table. In block 1108, the component sets the constraint derived flag to true to indicate that a constraint has been derived and then completes.

Figure 12:
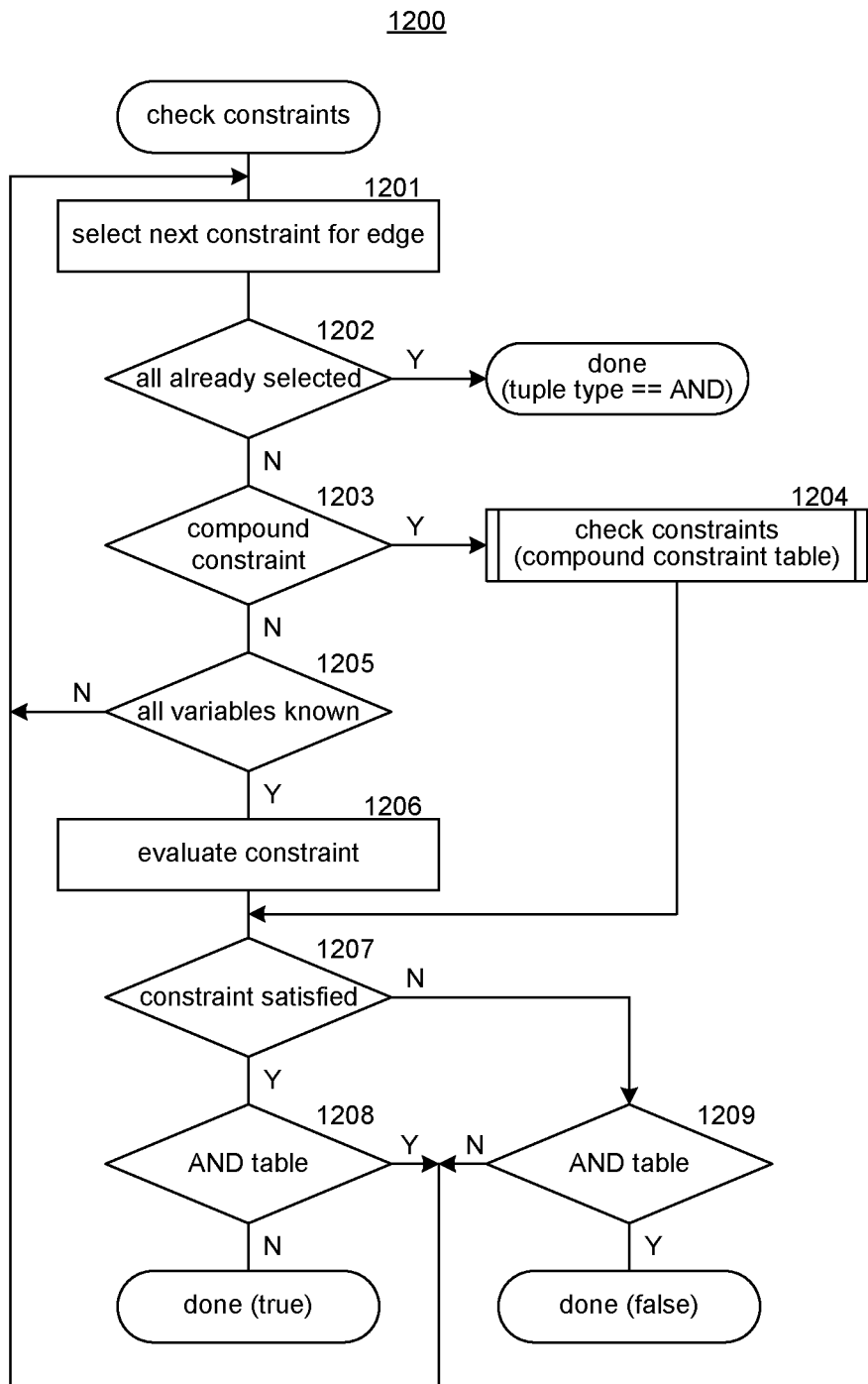
FIG. 12 is a flow diagram that illustrates the processing of a check constraints component of the DC system in some embodiments.

FIG. 12 is a flow diagram that illustrates the processing of a check constraints component of the DC system in some embodiments. The check constraints component 1200 is invoked, passing an indication of the constraint table, an edge, and a partial matching path, and determines whether adding the edge to the partial matching path would satisfy the constraints relating to that edge in the constraints table. In block 1201, the component selects the next constraint of the constraint table relating to that edge. In decision block 1202, if all the constraints have already been selected, then the component completes, returning a value of true if the type of the constraint table is AND because all the constraints have been satisfied and false if the type of the constraint table is OR because none of the constraints have been satisfied. In decision block 1203, if the selected constraint is a compound constraint, as indicated by a pointer in the child constraint table for the constraints of the compound constraint, then the component continues at block 1204, else the component continues at block 1205. In block 1204, the component recursively invokes a check constraints component, passing an indication of the child constraint table for the compound constraint, which returns an indication of whether the constraints of the compound constraint table have been satisfied. In decision block 1205, if all the variables for the selected constraint are known, then the component continues at block 1206, else the component loops to block 1201 to select the next constraint. All the variables for the constraint will not be known, for example, when the constraint depends on the value of the property of the next edge to be added to the partial matching path. In block 1206, the component evaluates the constraint based on the values of the variables. In decision block 1207, if the constraint is satisfied, then the component continues at block 1208, else the component continues at block 1209. In decision block 1208, if the constraint table has the type of AND, then the component loops to block 1201 to continue checking whether all constraints relating to the edge whose variables are known are satisfied, else the component completes, returning an indication that the constraint of the constraint table of type OR is satisfied because at least one constraint is satisfied. In decision block 1209, if the constraint table has the type of AND, then the component completes, returning an indication that the constraint of the constraint table of type AND is not satisfied because at least one constraint is not satisfied, else the component loops to block 1201 to continue checking whether at least one constraint relating to the edge whose variables are known is satisfied.

Figure 13:
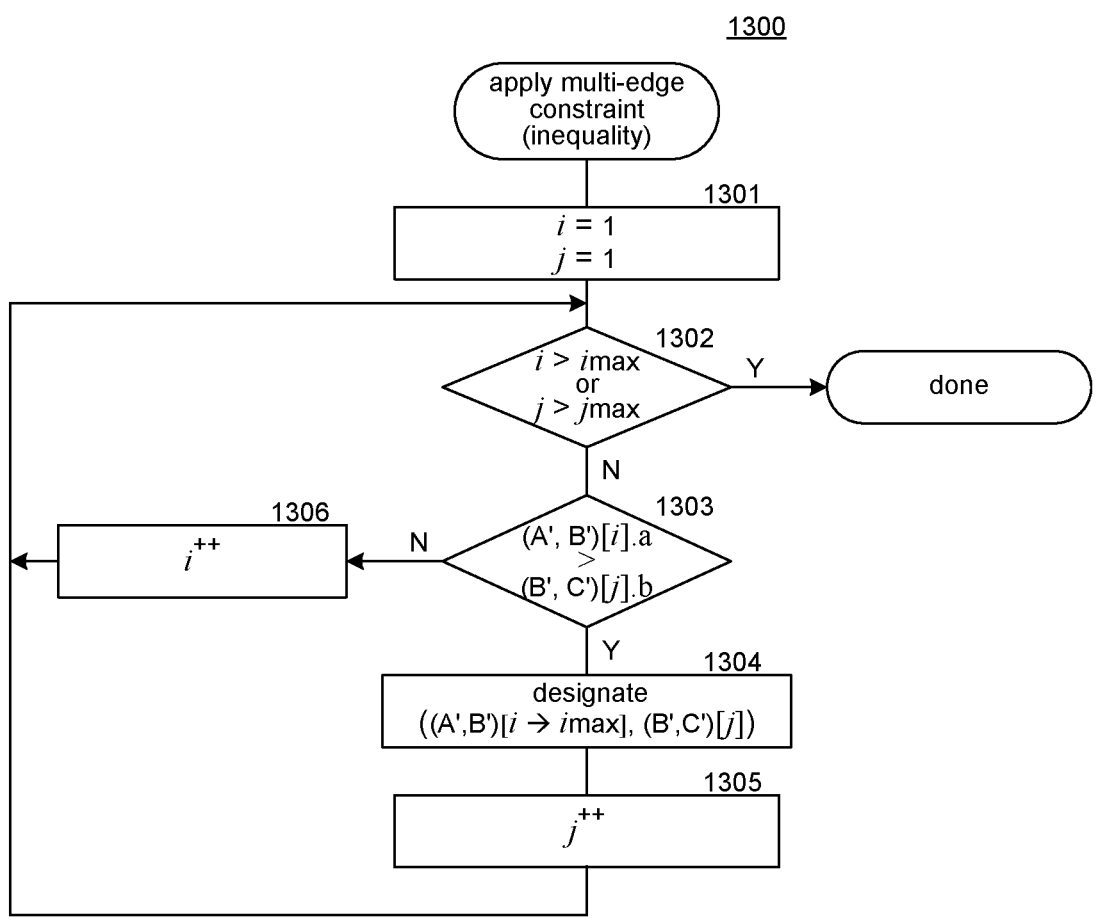
FIGS. 13 and 14 are flow diagrams that illustrate the processing of an apply multi-edge constraint component of the SP system in some embodiments.
Figure 14:
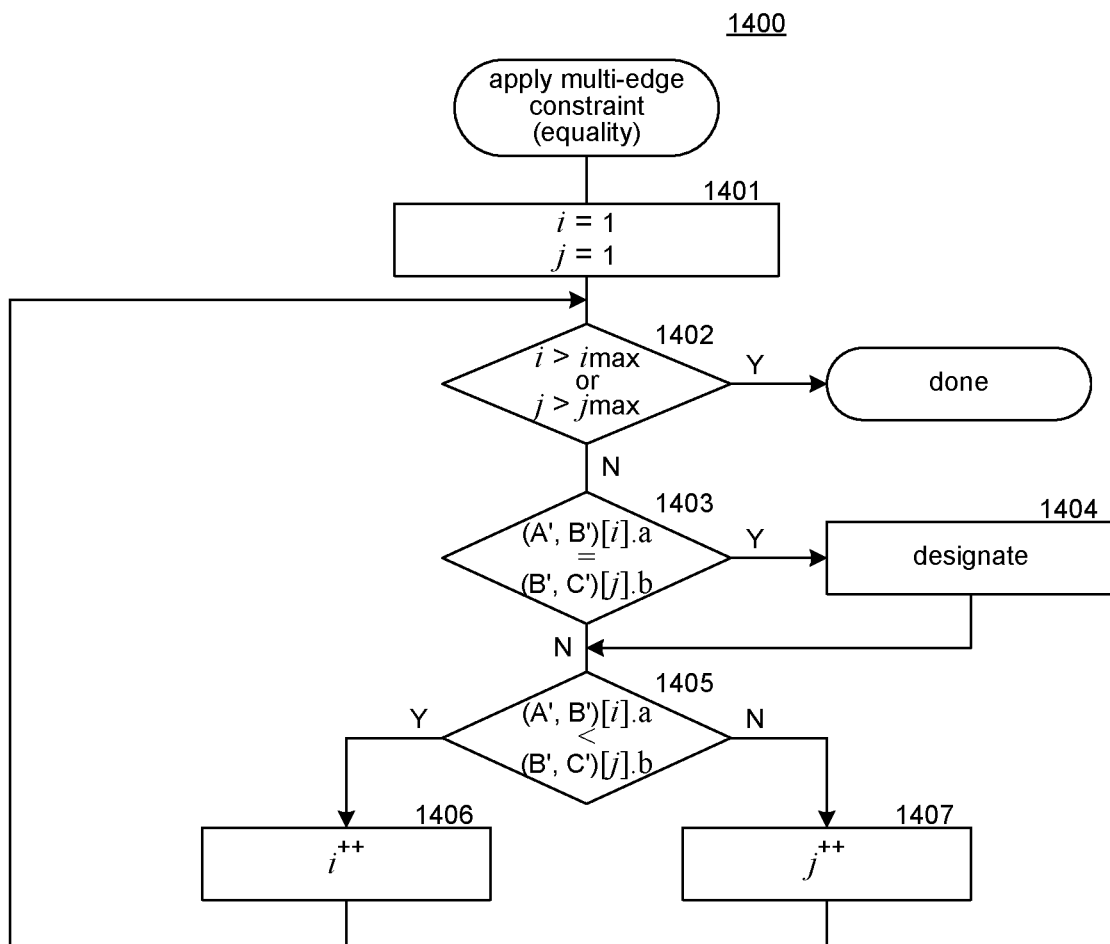

FIG. 13 is a flow diagram that illustrates the processing of an apply multi-edge constraint component of the SP system in some embodiments. The apply multi-edge constraint component 1300 is invoked to determine which combinations of a first edge from a set of first edges and a second edge from a set of second edges satisfy the multi-edge constraint. In block 1301, the component initializes a current first edge index i and a current second edge index j. In decision block 1302, if the current first edge index is greater than the number of first edges or the current second edge index is greater than the number of second edges, then the component completes, else the component continues at block 1303. In decision block 1303, if the current first edge and the current second edge satisfy the constraint, then the component continues at block 1304, else the component continues at block 1306. In block 1304, the component designates as satisfying the multi-edge constraint each combination of the current second edge and a first edge from the current first edge to the end first edge. In block 1305, the component increments the second current edge index and loops to block 1302 to determine whether a termination condition is satisfied. In block 1306, the component increments the first current edge index and loops to block 1302 to determine whether a termination condition is satisfied.

The following paragraphs describe various embodiments of aspects of the GSOS. An implementation of the GSOS system may employ any combination of the embodiments. The processing described below may be performed by a computing device with a processor that executes computer-executable instructions stored on a computer-readable storage medium that implements the GSOS.

In some embodiments, a method performed by a computing device for finding a path in a graph that matches a path pattern is provided. The path pattern has pattern vertices and pattern edges with each pattern edge having a constraint. The graph has graph vertices and graph edges with each graph vertex having a count of connected edges. The method establishes a partial matching path of graph edges that matches a portion of the path pattern. A start graph edge in the partial matching path is connected to a start graph vertex, and an end graph edge in the partial matching path is connected to an end graph vertex. The method extends the partial matching path by performing the following. The method determines a predecessor count of predecessor graph edges connected to the start graph vertex that match the constraint for the next predecessor pattern edge of the path pattern. The method then determines a successor count of successor graph edges connected to the end graph vertex that match the constraint for the next successor pattern edge of the path pattern. When the predecessor count is less than the successor count, the method add to the partial matching path as a new start graph edge one of the predecessor graph edges. When the predecessor count is not less than the successor count, the method adds to the partial matching path as a new end graph edge one of the successor graph edges. In some embodiments, the constraint is a direction of an edge. In some embodiments, the establishing of a partial matching path includes initializing the partial matching path with a graph edge that matches the constraint of an anchor pattern edge. In some embodiments, the method further, for each graph edge that matches the constraint of the anchor pattern edge, initializes the partial matching path with that graph edge and extending that partial matching path. In some embodiments, the constraint is based on a value of a property of a graph edge. In some embodiments, the constraint is based on a value of a property of a graph vertex. In some embodiments, 7 the path pattern is a cycle. In some embodiments, the graph is a directed graph and the path pattern is a directed pattern. In some embodiments, the path pattern is a directed cycle. In some embodiments, the constraint is a direction of an edge. In some embodiments, the method further, when the predecessor count is less than the successor count, for each predecessor graph edge, schedule a thread of execution to extend the partial matching path with a predecessor graph edge as a new start graph edge of the partial matching path. When the predecessor count is not less than the successor count, for each successor graph edge, the method schedules a thread of execution to extend the partial matching path with a successor graph edge as a new end graph edge of the partial matching path.

In some embodiments, a computing system for finding a pattern within a graph is provided. The computing system comprises one or more computer-readable storage mediums and one or more processors for executing computer-executable instructions stored in the one or more computer-readable storage mediums. The one or more computer-readable storage mediums store a graph that has vertices and edges, a path pattern that has vertices and edges, and computer-executable instructions for controlling the computing system. The instructions control the computing system to find a path of the graph that matches the path pattern by extending a partial matching path that matches a sub-path of the path pattern in a direction based on a predecessor count of edges that match a constraint of a predecessor edge specified by the path pattern and a successor count of edges that match a constraint of a successor edge specified by the path pattern. In some embodiments, the graph is a directed graph and the constraint is a direction of an edge. In some embodiments, the path pattern is a cycle. In some embodiments, the constraint is based on a value of a property of an edge. In some embodiments, the constraint is based on a value of a property of vertex. In some embodiments, the computer-executable instructions further control the computing system to schedule a thread of execution for different edges that match the constraint to extend the partial matching path in the direction of the smaller of the predecessor count and the successor count. In some embodiments, the path pattern has a path pattern length and the partial matching path has a partial matching path length, and the partial path is extended only while the partial matching path length is less than the path pattern length.

In some embodiments, a method performed by one or more computing systems for finding a path in a graph that matches a path pattern is provided. The path pattern has pattern vertices and pattern edges. At least some of the pattern edges have a constraint. The graph has graph vertices and graph edges with graph vertices having a count of connected edges. The method establishes a partial matching path of graph edges that matches a portion of the path pattern. The partial matching path has a start graph vertex and an end graph vertex. The method extends the partial matching path based a predecessor count of predecessor graph edges to the start graph vertex that match the constraint for the next predecessor pattern edge of the path pattern and a successor count of successor graph edges connected to the end graph vertex that match the constraint for the next successor pattern edge of the path pattern. In some embodiments, the constraint is a direction of an edge. In some embodiments, the establishing of a partial matching path includes initializing the partial matching path with a graph edge that matches the constraint of an anchor pattern edge.

In some embodiments, a method performed by one or more computing systems for identifying a path pattern within a property graph is provided. The method accesses a first constraint for a first pattern element of the path pattern and a second constraint for a second pattern element of the path pattern. The first constraint is based on a value of a first property of the first pattern element and a value of a second property of the second pattern element, and the second constraint is based on a value of the second property of the second pattern element. The method derives, from the first constraint and the second constraint, a derived constraint for the first pattern element that is based on a value of the first property of the first pattern element and not on a value of the second property of the second pattern element. When determining whether a graph matching edge of the property graph is to be added to a partial matching path of the property graph that matches a portion of the path pattern, the method determines whether the value of the first property of the graph element associated with the graph edge satisfies the derived constraint. In some embodiments, the element is a graph edge. In some embodiments, the element is a graph vertex. In some embodiments, the method further accesses a rule for deriving a derived constraint. The rule specifies conditions and a derived constraint that can be derived when the conditions are satisfied. In some embodiments, the method further applies the rule to derive the derived constraint. In some embodiments, the method further accesses multiple rules for deriving derived constraints. In some embodiments, the method further extends the partial matching path in a direction based on a predecessor count of graph edges that satisfy a derived constraint of a predecessor edge specified by the path pattern and a successor count of graph edges that satisfy a constraint of a successor edge specified by the path pattern.

In some embodiments, a computing system for deriving constraints for a path pattern of a property graph is provided. The path pattern has elements with initial constraints. The computing system comprises one or more computer-readable storage mediums and one or more processors for executing the computer-executable instructions stored in the one or more computer-readable storage mediums. The one or more computer-readable storage mediums store rules specifying conditions and derived constraints that can be derived when the conditions are satisfied and computer-executable instructions. The computer-executable instructions control the computing system to access initial constraints for a target pattern element of the path pattern, the initial constraints including a next initial constraint based on a value of a property of a next pattern element adjacent to the target pattern element in the path pattern. The computer-executable instructions also control the computing system to apply the rules to the initial constraints to derive one or more derived constraints, including a derived constraint that is derived from a next base constraint and that is not based on a value of a property of the next pattern element. In some embodiments, the element is a graph edge. In some embodiments, the element is a graph vertex. In some embodiments, the computer-executable instructions further include instructions to, when determining whether a graph edge corresponding to the target pattern edge of the path pattern is to be added to a partial matching path that matches a portion of the path pattern, determine whether the graph edge satisfies a derived constraint. In some embodiments, the rules are applied to initial constraints and previously derived constraints. In some embodiments, the rules are transitively applied.

In some embodiments, a computing system for deriving constraints for a path pattern of a property graph is provided. The computing system comprises one or more computer-readable storage mediums storing computer-executable instruction and one or more processors for executing the computer-executable instructions stored in the one or more computer-readable storage mediums. The computer-executable instructions control the computing system to access initial constraints for a target pattern element of the path pattern. The initial constraints include a next initial constraint that is based on a value of a property of a next pattern element adjacent to the target pattern element in the path pattern. The computer-executable instructions control the computing system to generate a derived constraint from the next initial constraints, the derived constraint not being based on value of a property of the next element. In some embodiments, the computer-executable instructions further control the computing system to, when determining whether a graph edge corresponding to the target pattern edge of the path pattern is to be added to a partial matching path that matches a portion of the path pattern, determine whether the element associated with the graph edge satisfies the derived constraint. In some embodiments, the computer-executable instructions further control the computing system to generate derived constraints from initial constraints that are not based on a value of a next pattern element adjacent to the target pattern element in the path pattern. In some embodiments, the computer-executable instructions that control the computing system to generate a derived constraint apply rules specifying conditions and derived constraints.

In some embodiments, a method performed by a computing system is provided to identify edges of a property graph that satisfy a multi-edge constraint that specifies a first property of a first edge, a second property of a second edge, and an order relation between the first property and the second property. The method accesses a first sort of first edges connected to a first vertex. The first sort is based on a value of the first property of the first edges. The method accesses a second sort of second edges connected to a second vertex. The second sort based on a value of the second property of the second edges. The method initializes a current first edge to a start first edge of the first sort and a current second edge to a start second edge of the second sort. The method repeat the following until a termination criterion is satisfied. When the multi-edge constraint is not satisfied by the current first edge and the current second edge, the method advances the current first edge. When the multi-edge constraint is satisfied by the current first edge and the current second edge, the method designates as satisfying the multi-edge constraint each combination the current second edge and each first edge from the current first edge to an end edge and advances advancing the current second edge. In some embodiments, the multi-edge constraint is that a value of a first property of a first edge is greater than a value of a second property of the second edge. In some embodiments, the first sort and the second sort are in increasing order. In some embodiments, the multi-edge constraint is a constraint of a path pattern. In some embodiments, the edges are identified when searching for a matching path of the property graph that matches the path pattern. In some embodiments, the method further generates the first sort and the second sort. In some embodiments, the advancing of a current edge includes performing a binary search between the current edge and an end edge of a sort to identify the next edge in the sort that satisfies the multi-edge constraint.

In some embodiments, a computing system for identifying edges of a property graph that satisfy a multi-edge constraint. The computing system comprises one or more computer-readable storage mediums storing computer-executable and one or more processors for executing the computer-executable instructions stored in the one or more computer-readable storage mediums. The instructions control the computing system to traverse a first sort of first edges and a second sort of second edges in order by repeatedly performing the following. The instructions advance a current first edge through the first sort until the current first edge and a current second edge satisfy the multi-edge constraint. The instructions designate as satisfying the constraint each combination of the current second edge and a first edge from the current first edge to an end first edge at one end of the first sort. The instructions also advance the second current edge through the second sort until the current first edge and the current second edge do not satisfy the multi-edge constraint. In some embodiments, when the multi-edge constraint specifies that a value of a first property of the first edge is greater than a value of a second property of the second edge, the first sort and the second sort are in increasing order, and the end first edge is the first edge with the largest value of the first property. In some embodiments, the multi-edge constraint is a constraint of a path pattern. In some embodiments, the edges are identified when searching for a matching path of the property graph that matches the path pattern. In some embodiments, the computer-executable instructions further control the computing system to generate the first sort and the second sort. In some embodiments, the computer-executable instructions that control the computing system to advance a current edge performs a binary search between the current edge and an end edge of a sort to identify the next edge in the sort that satisfies the multi-edge constraint.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for identifying a path pattern within a property graph based on optimizing the path pattern prior to searching the property graph, the method comprising:
    accessing a first constraint for a first pattern element of the path pattern and a second constraint for a second pattern element of the path pattern, the first constraint being based on a value of a first property of the first pattern element and a value of a second property of the second pattern element, the second constraint being based on a value of the second property of the second pattern element;
    prior to searching the property graph, optimizing the path pattern by deriving, from the first constraint and the second constraint, a derived constraint for the first pattern element that is based on a value of the first property of the first pattern element and not on a value of the second property of the second pattern element; and
    searching the property graph to determine whether the property graph includes a path that matches the path pattern, the searching including when determining whether a graph edge of the property graph is to be added to a partial matching path of the property graph that matches a portion of the path pattern, determining whether the value of the first property of the graph element associated with the graph edge satisfies the derived constraint.

2. The method of claim 1 wherein the element is a graph edge.

3. The method of claim 1 wherein the element is a graph vertex.

4. The method of claim 1 further comprising accessing a rule for deriving a derived constraint, the rule specifying conditions and a derived constraint that can be derived when the conditions are satisfied.

5. The method of claim 2 further comprising applying the rule to derive the derived constraint.

6. The method of claim 2 further comprising accessing multiple rules for deriving derived constraints.

7. The method of claim 1 further comprising extending the partial matching path in a direction based on a predecessor count of graph edges that satisfy a derived constraint of a predecessor edge specified by the path pattern and a successor count of graph edges that satisfy a constraint of a successor edge specified by the path pattern.

8. A computing system for deriving constraints for a path pattern prior to searching a property graph for a path that matches the path pattern, the path pattern having elements with initial constraints, the computing system comprising:
    one or more computer-readable storage mediums storing:
        rules specifying conditions and derived constraints that can be derived when the conditions are satisfied; and
        computer-executable instructions for controlling the computing system to:
            access initial constraints for a target pattern element of the path pattern, the initial constraints including a next initial constraint based on a value of a property of a next pattern element adjacent to the target pattern element in the path pattern; and
            apply the rules to the initial constraints to derive one or more derived constraints, including a derived constraint that is derived from a next base constraint and that is not based on a value of a property of the next pattern element;
            wherein the derived constraint represents an optimization for the path pattern to be used when searching the property graph for a path that matches the path pattern and
    one or more processors for executing the computer-executable instructions stored in the one or more computer-readable storage mediums.

9. The computing system of claim 8 wherein the element is a graph edge.

10. The computing system of claim 8 wherein the element is a graph vertex.

11. The computing system of claim 8 wherein the computer-executable instructions further include instructions to, when determining whether a graph edge corresponding to the target pattern edge of the path pattern is to be added to a partial matching path that matches a portion of the path pattern, determine whether the graph edge satisfies a derived constraint.

12. The computing system of claim 8 wherein the rules are applied to initial constraints and previously derived constraints.

13. The computing system of claim 12 wherein the rules are transitively applied.

14. A computing system for deriving constraints for a path pattern prior to searching a property graph for a path that matches the path pattern, the computing system comprising:
    one or more computer-readable storage mediums storing computer-executable instructions for controlling the computing system to:
        access initial constraints for a target pattern element of the path pattern, the initial constraints including a next initial constraint being based on a value of a property of a next pattern element adjacent to the target pattern element in the path pattern; and
        generate a derived constraint from the next initial constraints, the derived constraint not being based on value of a property of the next element;

wherein the derived constraint represents an optimization for the path pattern to be used when searching the property graph for a path that matches the path pattern and one or more processors for executing the computer-executable instructions stored in the one or more computer-readable storage mediums.

15. The computing system of claim 14 wherein the computer-executable instructions further control the computing system to, when determining whether a graph edge corresponding to the target pattern edge of the path pattern is to be added to a partial matching path that matches a portion of the path pattern, determine whether the element associated with the graph edge satisfies the derived constraint.

16. The computing system of claim 14 wherein the computer-executable instructions further control the computing system to generate derived constraints from initial constraints that are not based on a value of a next pattern element adjacent to the target pattern element in the path pattern.

17. The computing system of claim 16 wherein the computer-executable instructions that control the computing system to generate a derived constraint apply rules specifying conditions and derived constraints.

* * * * *